United States Patent [19]

Shahamat et al.

[11] Patent Number: 4,968,912

[45] Date of Patent: Nov. 6, 1990

[54] SINGLE PIECE PUNCHED AND BENT NEUTRAL LEAD

[75] Inventors: Mohammad Shahamat; Hassan Mansir, both of Rockford, Ill.

[73] Assignee: Sundstrand Corporation, Rockford, Ill.

[21] Appl. No.: 396,322

[22] Filed: Aug. 21, 1989

[51] Int. Cl.⁵ .................. H02K 11/00; H02K 5/00
[52] U.S. Cl. .................... 310/71; 310/68 C; 310/91; 310/260; 336/174; 361/47
[58] Field of Search ............... 310/68 C, 71, 91, 208, 310/216, 254, 260, 270; 336/65, 173, 174, 175, 215; 361/42, 47, 48, 50

[56] References Cited

U.S. PATENT DOCUMENTS

| | | | |
|---|---|---|---|
| 2,829,338 | 4/1958 | Lord | 336/174 |
| 4,013,985 | 3/1977 | Graham | 336/175 |
| 4,054,856 | 10/1977 | Linscott, Jr. | 336/84 M |
| 4,321,493 | 3/1982 | Wefel | 310/68 D |
| 4,437,083 | 3/1984 | Emery | 336/65 |
| 4,591,942 | 5/1986 | Willard et al. | 361/97 |
| 4,623,865 | 11/1986 | Kiesel et al. | |
| 4,689,546 | 8/1987 | Stephens et al. | 322/99 |

*Primary Examiner*—Patrick R. Salce
*Assistant Examiner*—D. L. Rebsch
*Attorney, Agent, or Firm*—Wood, Phillips, Mason, Recktenwald & Vansanten

[57] ABSTRACT

The problem of effectively and quickly detecting fault conditions in an electromotive machine (10) is solved using a current transformer assembly (28) having a neutral lead (44). The neutral lead (44) comprises a single piece copper strap (80) having laterally extending strips or posts (81-83) provided for connection to the neutral end conductors (31-33) of armature windings (22 and 24). The strap (80) is punched and bent into shape to include the three neutral posts (81-83). Each neutral post (81-83) carries a current transformer (46-48).

13 Claims, 3 Drawing Sheets

SINGLE PIECE PUNCHED AND BENT NEUTRAL LEAD

FIELD OF THE INVENTION

This invention relates to electromotive machines and, more particularly, to an improved fault detection system therefor.

BACKGROUND OF THE INVENTION

In electrical power generating systems there is a need to effectively and quickly detect short circuits that arise during operation of a generator which is connected to an electrical distribution system. In applications such as an aircraft, the need for rapid fault detection is important so that the short circuit can be alleviated to prevent an electrical fire aboard the aircraft.

One example of a fault detection system is shown in Wefel U.S. Pat. No. 4,321,493, assigned to the assignee of the present invention, which discloses a current transformer support assembly in an electromotive machine. An armature in the machine housing includes end windings having radially disposed neutral armature conductors. The support assembly includes an arcuate shaped support member secured internally of the housing and provided with at least one well shaped opening in which a current transformer is positioned. A neutral armature assembly includes an arcuate strap secured to the support member. The neutral armature assembly also includes a neutral post for each phase which acts as a primary for the current transformer. The neutral lead is secured to the strap as by brazing and passes through a central opening in the current transformer for electrical connection to the neutral armature conductor.

The above neutral armature assembly requires the brazing of the several parts during the manufacturing process. Further, with such a brazed connection it is possible that the connection could loosen which might result not only in loss of efficiency in power generation, but also cause less rapid detection of fault conditions.

The present invention is intended to overcome one or more of the problems as set forth above.

SUMMARY OF THE INVENTION

In accordance with the present invention, an electromotive machine is provided with a single piece neutral lead.

Broadly, there is disclosed herein an improvement in an electromotive machine having a stator carrying a polyphase stator winding, wherein the winding for each phase has a phase end conductor and a neutral end conductor, the phase end conductor being connected to a phase terminal, a plurality of current transformers, one for each phase, and means for supporting each current transformer adjacent the stator winding. The improvement comprises a single piece neutral lead connected to each neutral end conductor of the stator winding and to a neutral terminal. The neutral lead includes an elongate strap connected to a plurality of neutral posts, one for each phase, wherein each said neutral post passes through one of the current transformers and is connected to one of the stator winding neutral end conductors.

It is a feature of the invention that the neutral lead further comprises a terminal post connected between the strap and the neutral terminal.

It is another feature of the invention that the neutral lead comprises a punched elongate strap of copper including a plurality of outwardly laterally extending elongate strips bent and turned to form each of the neutral posts.

It is a further feature of the invention that the neutral lead further comprises another outwardly laterally extending elongate strip bent to form a terminal post, the terminal post being connected to the neutral terminal.

It is an additional feature of the invention that the elongate strap comprises an arcuate strap.

It is still a further feature of the invention that the stator winding is a three-phase winding and the neutral lead includes three longitudinally spaced posts connected to the strap.

It is yet an additional feature of the invention that the machine further comprises means for securing the neutral lead to the supporting means.

There is disclosed herein according to another aspect of the invention a fault detection system for an electrical generating machine having a housing and a stator in the housing carrying a polyphase armature winding, wherein the winding for each phase has a phase end conductor and a neutral end conductor, the phase end conductor being connected to a phase terminal, to develop electrical power. The system comprises a single piece neutral lead, a plurality of donut-shaped current transformers each having a central opening receiving a post for the neutral lead, means for supporting the current transformers and the neutral lead in the housing, and a fault detection circuit connected to each of the current transformers.

The invention relates to a neutral lead used in connection with an integrated drive generator. Specifically, the generator includes a stator having a distributed three-phase AC winding. Each phase comprises a separate winding. One end of each winding connects to an output terminal for its associated phase. The opposite end of each winding is known as the neutral end when used in a wye configuration.

Specifically, according to the invention, a single piece copper strap is provided for interconnecting the neutral ends of each winding. The copper strap is punched and bent into shape to include three neutral posts, for connection to each winding, and a terminal post for connecting to a neutral terminal. Each neutral post carries a current transformer.

Further features and advantages of the invention will readily be apparent from the specification and from the drawings.

BRIEF DESCRIPTION OF THE DRAWINGS

FIG. 2 is a section taken along the line 2—2 in

DETAILED DESCRIPTION OF THE INVENTION

Figure 1:
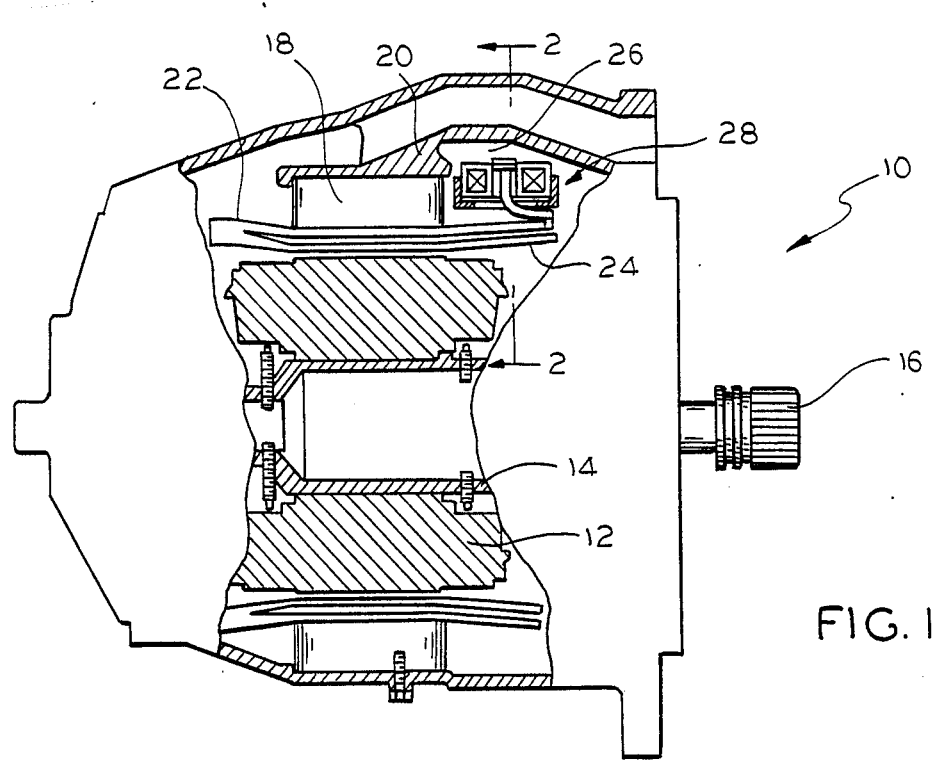
FIG. 1 is a partial section of a generator incorporating the neutral lead according to the invention.

Referring first to FIG. 1, an electrical generator 10 includes a rotor 12 mounted on a shaft 14. The shaft 14 is driven by an input shaft 16. A stator 18 is press fit into a generator housing 20. The stator 18 carries stator armature windings, shown schematically at 22 and 24. The housing 20 includes a recessed portion 26 which houses a current transformer support assembly 28.

In a typical application, the input shaft 16 is driven by the main engine in an aircraft, and rotation of the rotor 12 with the shaft 14 sets up a rotating magnetic field in space occupied by the stator 18 to develop output power in the armature windings 22 and 24.

Figure 2:
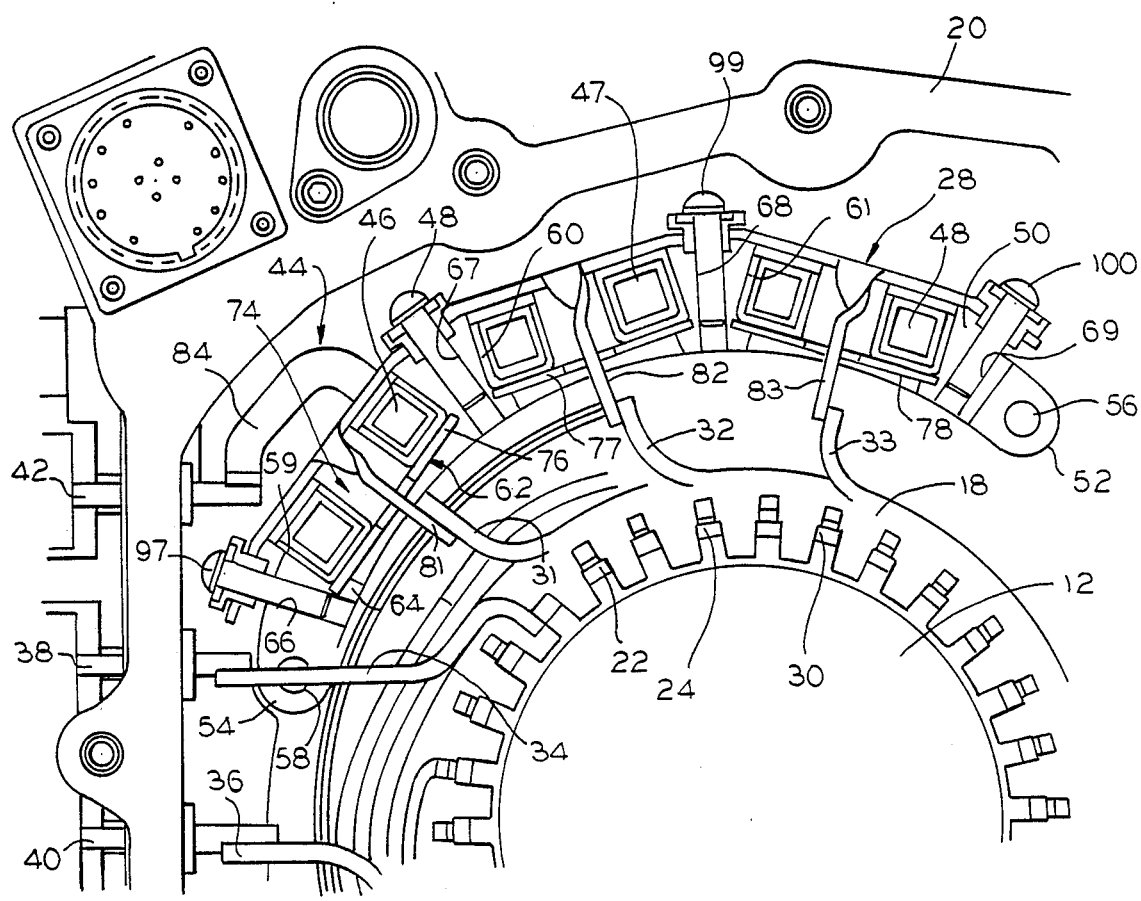

With reference to FIG. 2, the stator 18 includes a plurality of stator slots, illustrated typically at 30. Each slot 30 carries a portion of the stator windings 22 and 24. In the illustrated embodiment, the generator 10 is a three-phase generator. Thus, there are three separate windings carried in the stator slots, as is well known. The three windings each include a respective neutral armature end conductor 31-33. Each phase winding also includes a phase end conductor, two of which are illustrated at 34 and 36. The phase end conductors 34 and 36 are electrically coupled to respective phase terminals 38 and 40 at which is developed the output power from the generator. A neutral terminal 42 is provided for electrical connection to the neutral end conductors 31-33 via a neutral lead 44 according to the invention, as discussed more specifically below.

Figure 3:
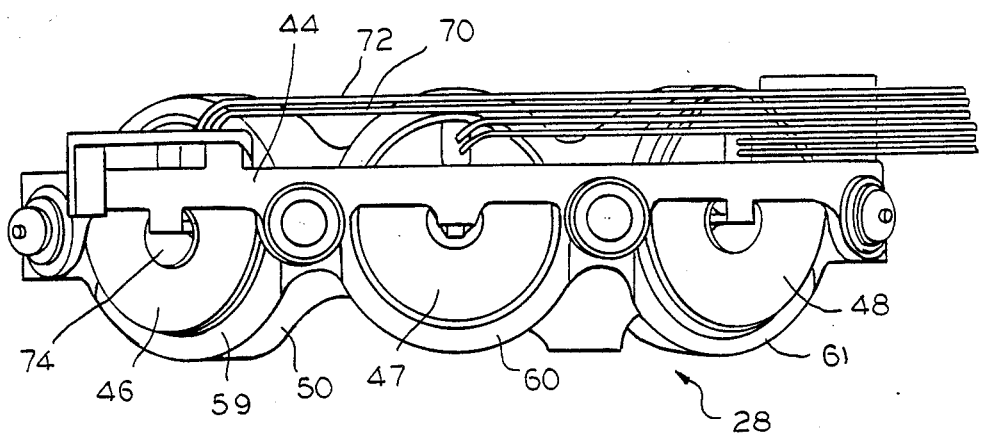
FIG. 3 is a perspective view of a current transformer support assembly.

With reference also to FIG. 3, the current transformer support assembly 28 includes three current transformers 46-48, the neutral lead 44 and a current transformer support member 50.

The current transformer support member 50 is provided with mounting flanges 52 and 54 having central respective openings 56 and 58 through which suitable bolts (not shown) can be inserted for mounting the support member 50 to the housing 20. The support member 50 includes three well-shaped chambers 59-61. Each of the well-shaped chambers 59-61 are identical and the details of construction of one of these chambers will be explained. For example, the first chamber 59 is provided at the bottom with a central opening 62 and a peripherally disposed lip 64. A plurality of threaded openings 66-69 are provided with a chamber 59-61 disposed between adjacent pairs thereof. For example, the first well-shaped chamber 59 is disposed between the first and second threaded openings 66 and 67.

Figures 4, 5:
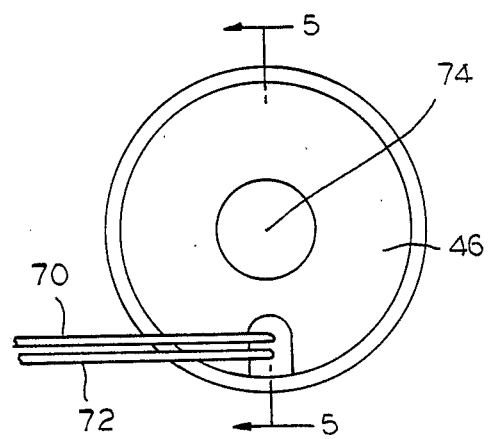
FIG. 4 is a top view of a current transformer employed in carrying out the invention.
FIG. 5 is a sectional view taken along the line 5—5 in FIG. 4.

Each of the well-shaped chambers 59-61 has positioned therein the respective current transformers 46-48. The current transformers 46-48 are donut-shaped, as shown by the first current transformer 46, see FIGS. 4 and 5. The current transformer 46 is conventional in construction and is provided with a pair of leads 70 and 72 and a central opening 74. With specific reference to FIG. 2, positioned beneath each current transformer 46-48 and resting on the lip, e.g. the lip 64, is an electromagnetic shield 76-78, respectively. The shields 76-78 take on the appearance of a washer having a central opening.

Figure 6:
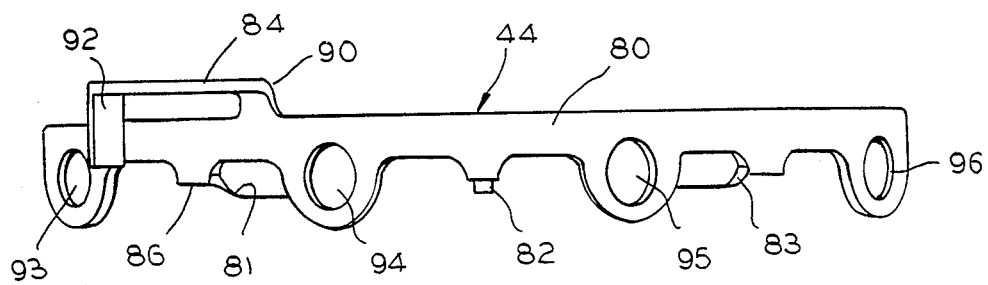
FIG. 6 is a top view of a neutral lead according to the invention.
Figure 7:
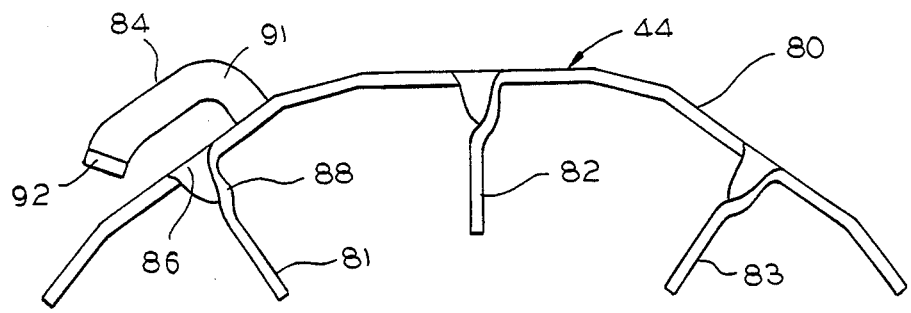
FIG. 7 is a side view of the neutral lead of FIG. 6.

With reference also to FIGS. 6 and 7, the neutral lead 44 is of single piece construction and is of punched copper which is bent to form the illustrated construction. Specifically, the neutral lead 44 comprises an elongate strap 80 including three longitudinally spaced laterally extending elongate strips 81-83 at one side of the strap 80. A fourth elongate strip 84 extends outwardly laterally from an opposite side of the strap 80. The strap 80 is bent into an arcuate configuration. The strips 81-83 are bent radially inwardly as at 85 for the first strip 81 and subsequently turned approximately ninety degrees as at 88. Each of the first three strips 81-83, as so bent and formed, defines a neutral post. The fourth strip 84 is bent outwardly as at 90, see FIG. 6, and has a ninety degree elbow 91 which extends to a turned flange 92. A plurality of apertures 93-96 extend through the strap 80, with a strip 81-83 disposed between each adjacent pair. For example, the first strip 81 is disposed between the first two apertures 93 and 94.

With specific reference to FIGS. 2 and 3, the fully assembled current transformer support assembly 28 is illustrated. The electromagnetic shields 76-78 are positioned in the bottom of the respective well-shaped chambers 59-61, resting on the lips, as the lip 64. Each of the current transformers 46-48 is inserted within its respective associated chamber 59-61. The neutral lead 44 is positioned above the current transformer support member 50 with the respective posts 81-83 extending through the central openings in the respective current transformers 46-48. The strap apertures 93-96 are thus positioned immediately above the support member threaded apertures 66-69. Suitable fasteners 97-100 are inserted through the openings 93-96 and are threadably received in the openings 66-69. Thus, the current transformers 46-48 are firmly held in place between the strap 80 of the neutral lead 44, the support member 50 and the electromagnetic shields 76-78, respectively.

Figure 9:
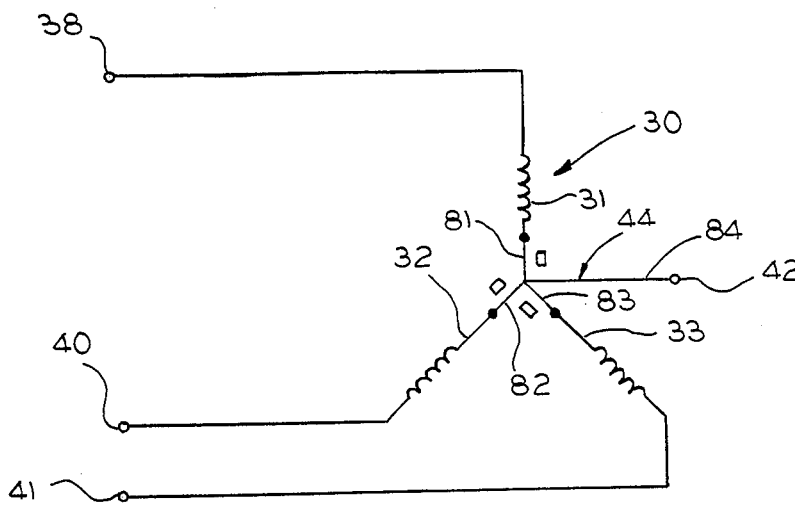
FIG. 9 is an electrical schematic showing the electrical connection of the neutral lead to the armature winding.

With the neutral posts 81-83 extending through the current transformers, as discussed above, the ends thereof are electrically connected to the respective armature winding neutral end conductors 31-33, see FIG. 2. The terminal post 84 is electrically connected to the neutral terminal 42. Thus, as illustrated in FIG. 9, the stator winding 30 is connected in a wye configuration with the neutral lead 44 providing a neutral connection to the neutral terminal 42. The posts 81-83 serve as primaries for each of the current transformers 46-48, respectively.

Figure 8:
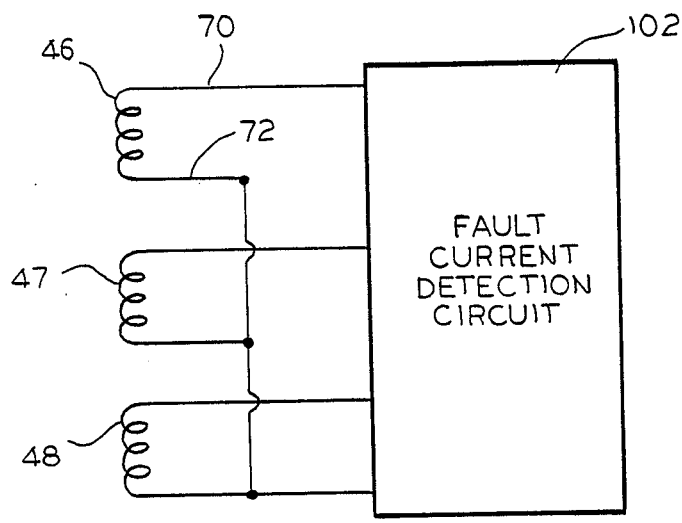
FIG. 8 is a schematic diagram of a fault detection system according to the invention.

FIG. 8 shows a schematic diagram in which each of the current transformers 46-48 is connected to a fault current detection circuit 102. The circuit 102 is operable to detect overcurrent conditions as sensed by any of the current transformers 46-48 when a short circuit condition exists, as is well known.

From the foregoing description, it should be apparent that the current transformer support assembly 28 provides a compact, rigid structure that enhances the integrity of the manner in which fault current transformers are secured within a generator, to thus improve current direction. Moreover, a single piece bent and formed neutral lead is of simple manufacture and provides long-term reliability.

We claim:

1. In an electromotive machine having a stator carrying a polyphase stator winding, wherein the winding for each phase has a phase end conductor connected to a phase terminal and a neutral end conductor, a plurality of current transformers, one for each phase, and means for supporting said current transformers adjacent said stator winding, the improvement comprising:

a single piece neutral lead connected to each neutral end conductor of said stator winding and to a neutral terminal, said neutral lead including an elongate strap connected to a plurality of neutral posts, one for each phase, wherein each said neutral post passes through one of said current transformers and is connected to one of said stator winding neutral ends.

2. The improvement of claim 1 wherein said neutral lead further comprises a terminal post connected between said strap and said neutral terminal.

3. The improvement of claim 1 wherein said neutral lead comprises a punched elongate strap of copper including a plurality of outwardly laterally extending elongate strips bent and turned to form said neutral posts.

4. The improvement of claim 3 wherein said neutral lead further comprises another outwardly laterally extending elongate strip bent to form a terminal post, said terminal post being connected to said neutral terminal.

5. The improvement of claim 3 wherein said elongate strap comprises an arcuate strap.

6. The improvement of claim 1 wherein said stator winding is a three-phase winding and said neutral lead includes three longitudinally spaced posts connected to said strap.

7. The improvement of claim 1 further comprising means for securing said neutral lead to said supporting means.

8. In an electrical generating machine having a housing, a stator in said housing carrying a polyphase armature winding, wherein the winding for each phase has a phase end conductor and a neutral end conductor, the phase end conductor being connected to a phase terminal to develop electrical power, a fault detection system comprising:

a single piece neutral lead connected to each neutral end conductor of said armature winding and to a neutral terminal, said neutral lead including an elongate strap connected to a plurality of neutral posts, one for each phase, wherein each said neutral post is connected to one of said armature winding neutral end conductors;

a plurality of donut-shaped current transformers, one for each phase, each having a central opening receiving one of said neutral posts for sensing current therethrough;

means for supporting said current transformers and said neutral lead in said housing; and a fault detection circuit connected to each of said current transformers.

9. The fault detection system of claim 8 wherein said neutral lead further comprises a terminal post connected between said strap and said neutral terminal.

10. The fault detection system of claim 8 wherein said neutral lead comprises a punched elongate strap of copper including a plurality of outwardly laterally extending elongate strips bent and turned to form said neutral posts.

11. The fault detection system of claim 10 wherein said neutral lead further comprises another outwardly laterally extending elongate strip bent to form a terminal post, said terminal post being connected to said neutral terminal.

12. The fault detection system of claim 10 wherein said elongate strap comprises an arcuate strap.

13. The fault detection system of claim 8 wherein said armature winding is a three-phase winding and said neutral lead includes three longitudinally spaced posts connected to said strap.

* * * * *